US012748495B2

(12) United States Patent
Galvane et al.

(10) Patent No.: US 12,748,495 B2
(45) Date of Patent: Sep. 29, 2026

(54) LOCATION-BASED HAPTIC SIGNAL COMPRESSION

(71) Applicant: InterDigital CE Patent Holdings, SAS, Paris (FR)

(72) Inventors: Quentin Galvane, Thorigne-Fouillard (FR); Fabien Danieau, Rennes (FR); Philippe Guillotel, Vern sur Seiche (FR)

(73) Assignee: InterDigital CE Patent Holdings, SAS, Paris (FR)

(*) Notice: Subject to any disclaimer, the term of this patent is extended or adjusted under 35 U.S.C. 154(b) by 252 days.

(21) Appl. No.: 18/694,534

(22) PCT Filed: Sep. 23, 2022

(86) PCT No.: PCT/EP2022/076519
§ 371 (c)(1),
(2) Date: Mar. 22, 2024

(87) PCT Pub. No.: WO2023/046899
PCT Pub. Date: Mar. 30, 2023

(65) Prior Publication Data

US 2025/0138639 A1 May 1, 2025

(30) Foreign Application Priority Data

Sep. 24, 2021 (EP) .................................... 21306318

(51) Int. Cl.
*G06F 3/01* (2006.01)

(52) U.S. Cl.
CPC .................................... *G06F 3/016* (2013.01)

(58) Field of Classification Search
CPC ........................... G06F 3/016; G06F 3/048–05
See application file for complete search history.

(56) References Cited

U.S. PATENT DOCUMENTS

2003/0210259 A1* 11/2003 Liu ....................... G06F 3/0346 715/702
2013/0222311 A1* 8/2013 Pesonen ................ G06F 3/0481 345/173

(Continued)

FOREIGN PATENT DOCUMENTS

| | | | |
|---|---|---|---|
| CN | 111966226 | A | 11/2020 |
| CN | 112631434 | A | 4/2021 |
| EP | 3112987 | A1 | 1/2017 |

OTHER PUBLICATIONS

A. Tirmizi, C. Pacchierotti, I. Hussain, G. Alberico and D. Prattichizzo, "A perceptually-motivated deadband compression approach for cutaneous haptic feedback," 2016 IEEE Haptics Symposium (Haptics), Philadelphia, PA, USA, 2016, pp. 223-228, doi: 10.1109/HAPTICS.2016.7463181. (Year: 2016).*

(Continued)

*Primary Examiner* — Daniel Rodriguez
(74) *Attorney, Agent, or Firm* — Klintworth & Rozenblat LLP

(57) ABSTRACT

A coding method allows to compress a haptic signal of a haptic effect. Compression parameters are determined at least based on a location where a haptic effect is to be applied. Information representative of the haptic effect comprises the compressed signal and the location. The location may be based on body segmentation, or vertex-based or texture-based. Corresponding decoding method, coding device, decoding device, computer program, non-transitory computer readable medium and system are described.

17 Claims, 9 Drawing Sheets

(56) References Cited

U.S. PATENT DOCUMENTS

| | | | | |
|---|---|---|---|---|
| 2014/0362014 | A1* | 12/2014 | Ullrich | G06F 3/0488 345/173 |
| 2015/0070269 | A1* | 3/2015 | Bhatia | G06F 3/167 345/156 |
| 2015/0154966 | A1* | 6/2015 | Bharitkar | G10L 19/008 381/23 |
| 2018/0182436 | A1* | 6/2018 | Ullrich | G11B 27/34 |
| 2019/0156639 | A1* | 5/2019 | Fleureau | H04N 21/23614 |
| 2019/0265792 | A1* | 8/2019 | Wu | G02B 27/0172 |
| 2020/0209967 | A1* | 7/2020 | Sherry | G06F 3/016 |
| 2022/0244784 | A1* | 8/2022 | Yamano | G06F 3/016 |
| 2023/0071068 | A1* | 3/2023 | Yamane | G06N 3/08 |
| 2025/0155979 | A1* | 5/2025 | Hiromi | B06B 1/0207 |

OTHER PUBLICATIONS

"The MPEG-V System Architecture: Overview", MPEG Document Management System (MDMS), Feb. 15, 2014, 1 page.

Craig, James C., "Difference threshold for intensity of tactile stimuli", Psychonomic Society, Inc., Perception & Psychophysics, vol. 11 (2), 1972, 3 pages.

Steinbach et al., "Haptic Codecs for the Tactile Internet", Institute of Electrical and Electronics Engineers (IEEE), Proceedings of the IEEE, vol. 107, Issue No. 2, Feb. 2019, 24 pages.

Muthusamy, Yeshwant, "A Standard for Haptics-Enabled Media Files", Electronic Design, Jul. 29, 2020, 9 pages.

"WAV: The Waveform Audio File Format", Wikipedia, The Free Encyclopedia, Oct. 24, 2020, 7 pages.

"Information technology—Coding of audio-visual objects. Part 12: ISO base media file format", International Standard, ISO/IEC 14496-12, Second edition, Apr. 1, 2005, 94 pages.

"Haptic Codecs for the Tactile Internet", Institute of Electrical and Electronics Engineers (IEEE), IEEE Standards Association; Working Group Site & Liaison Index, Haptic Codec Task Group P1918 1.1, Feb. 3, 2020, 1 page.

"Representing Haptic Patterns in AHAP Files: Understanding the Apple Haptic and Audio Pattern (AHAP) file format", Apple Developer Documentation, Jan. 30, 2021, 6 pages.

"Call for Proposals on the Coded Representation of Haptics—Phase 1", International Organization for Standardization (ISO), MPEG Technical Requirements, ISO/IEC JTC 1/SC 29/WG 2, Document: N0070, Online meeting, Apr. 2021, 32 pages.

* cited by examiner

| Body_Part_ID | Name | Body_Part_Mask | Hex |
|---|---|---|---|
| 1 | Head | 000000000000000000000001 | 0x000001 |
| 2 | Upper Chest | 000000000000000000000010 | 0x000002 |
| 3 | Chest | 000000000000000000000100 | 0x000004 |
| 4 | Pelvis | 000000000000000000001000 | 0x000008 |
| 5 | Right Upperarm | 000000000000000000010000 | 0x000010 |
| 6 | Left Upperarm | 000000000000000000100000 | 0x000020 |
| 7 | Right Forearm | 000000000000000001000000 | 0x000040 |
| 8 | Left Forearm | 000000000000000010000000 | 0x000080 |
| 9 | Right Hand Palm | 000000000000000100000000 | 0x000100 |
| 10 | Left Hand Palm | 000000000000001000000000 | 0x000200 |
| 11 | Right Hand Dorsum | 000000000000010000000000 | 0x000400 |
| 12 | Left Hand Dorsum | 000000000000100000000000 | 0x000800 |
| 13 | Right Hand Fingers | 000000000001000000000000 | 0x001000 |
| 14 | Left Hand Fingers | 000000000010000000000000 | 0x002000 |
| 15 | Right Thigh | 000000000100000000000000 | 0x004000 |
| 16 | Left Thigh | 000000001000000000000000 | 0x008000 |
| 17 | Right Calf | 000000010000000000000000 | 0x010000 |
| 18 | Left Calf | 000000100000000000000000 | 0x020000 |
| 19 | Right Foot Palm | 000001000000000000000000 | 0x040000 |
| 20 | Left Foot Palm | 000010000000000000000000 | 0x080000 |
| 21 | Right Foot Dorsum | 000100000000000000000000 | 0x100000 |
| 22 | Left Foot Dorsum | 001000000000000000000000 | 0x200000 |
| 23 | Right Foot Fingers | 010000000000000000000000 | 0x400000 |
| 24 | Left Foot Fingers | 100000000000000000000000 | 0x800000 |

Figure 4

| Body Part | Body_Part_Mask | Hex |
|---|---|---|
| Right Arm | 000000000001010101010000 | 0x001550 |
| Left Arm | 000000000010101010100000 | 0x002AA0 |
| Right Leg | 010101010100000000000000 | 0x554000 |
| Left Leg | 101010101000000000000000 | 0xAA8000 |
| Upper Body | 000000000011111111111111 | 0x003FFF |
| Lower Body | 111111111100000000000000 | 0xFFC000 |
| Full Body | 111111111111111111111111 | 0xFFFFFF |
Figure 6
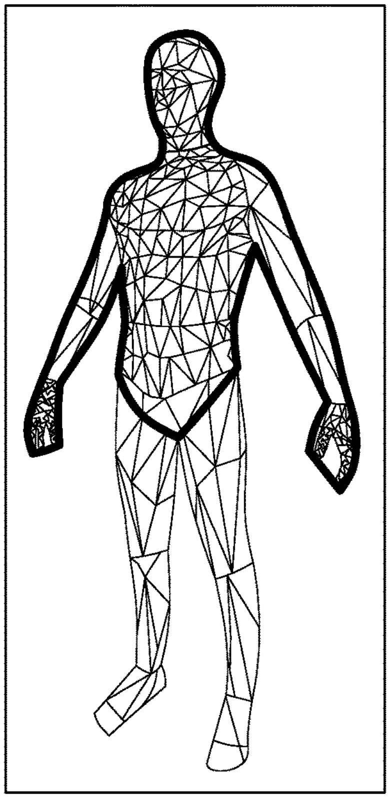
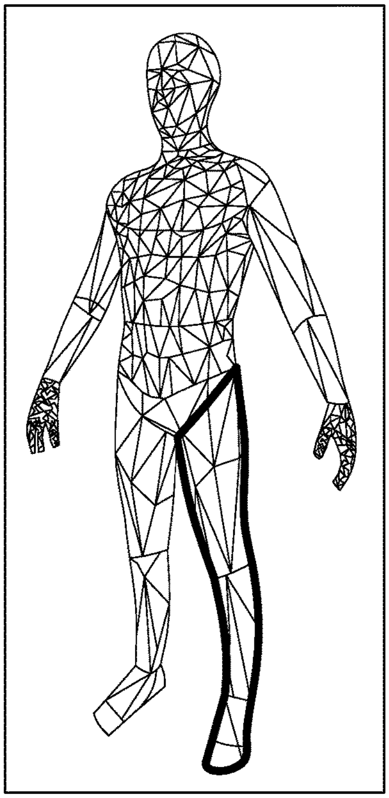
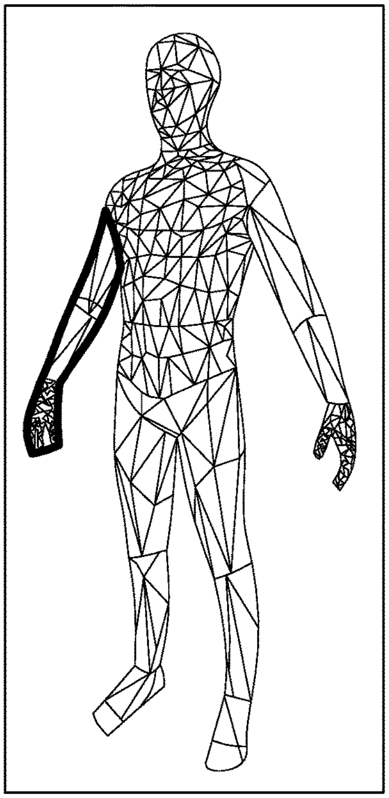
Figure 7A Figure 7B Figure 7C

| Body Part Number | Weber Fraction (%) | Max Frequency (Hz) |
|---|---|---|
| 1 | 5 | 300 |
| 2 | 9 | 100 |
| 3 | 9 | 100 |
| 4 | 9 | 100 |
| 5 | 7 | 200 |
| 6 | 7 | 200 |
| 7 | 6 | 150 |
| 8 | 6 | 150 |
| 9 | 5 | 100 |
| 10 | 5 | 100 |
| 11 | 5 | 100 |
| 12 | 5 | 100 |
| 13 | 5 | 100 |
| 14 | 5 | 100 |
| 15 | 7 | 200 |
| 16 | 7 | 200 |
| 17 | 7 | 200 |
| 18 | 7 | 200 |
| 19 | 6 | 150 |
| 20 | 6 | 150 |
| 21 | 6 | 150 |
| 22 | 6 | 150 |
| 23 | 6 | 150 |
| 24 | 6 | 150 |

Figure 10

LOCATION-BASED HAPTIC SIGNAL COMPRESSION

CROSS REFERENCE TO RELATED APPLICATIONS

This application is a U.S. National Stage Application under 35 U.S.C. § 371 of International Patent Application No. PCT/EP2022/076519, filed Sep. 23, 2022, which is incorporated herein by reference in its entirety.

This application claims priority to European Application No. 21306318.3, filed Sep. 24, 2021, which is incorporated herein by reference in its entirety.

TECHNICAL FIELD

At least one of the present embodiments generally relates to haptics and more particularly to the encoding and decoding of information representative of a haptic effect, wherein a haptic signal is compressed based on a location of where to apply the haptic effect.

BACKGROUND

Fully immersive user experiences are proposed to users through immersive systems based on feedback and interactions. The interaction may use conventional ways of control that fulfill the need of the users. Current visual and auditory feedback provide satisfying levels of realistic immersion. Additional feedback can be provided by haptic effects that allow a human user to perceive a virtual environment with his senses and thus get a better experience of the full immersion with improved realism. However, haptics is still one area of potential progress to improve the overall user experience in an immersive system.

Conventionally, an immersive system may comprise a 3D scene representing a virtual environment with virtual objects localized within the 3D scene. To improve the user interaction with the elements of the virtual environment, haptic feedback may be used through stimulation of haptic actuators. Such interaction is based on the notion of "haptic objects" that correspond to physical phenomena to be transmitted to the user. In the context of an immersive scene, a haptic object allows to provide a haptic effect by defining the stimulation of appropriate haptic actuators to mimic the physical phenomenon on the haptic rendering device. Different types of haptic actuators allow to restitute different types of haptic feedbacks.

An example of a haptic object is an explosion. An explosion can be rendered though vibrations and heat, thus combining different haptic effects on the user to improve the realism. An immersive scene typically comprises multiple haptic objects, for example using a first haptic object related to a global effect and a second haptic object related to a local effect.

The principles described herein apply to any immersive environment using haptics such as augmented reality, virtual reality, mixed reality or haptics-enhanced video (or omnidirectional/360° video) rendering, for example, and more generally apply to any haptics-based user experience. A scene for such examples of immersive environments is thus considered an immersive scene.

Haptics refers to sense of touch and includes two dimensions, tactile and kinesthetic. The first one relates to tactile sensations such as friction, roughness, hardness, temperature and is felt through the mechanoreceptors of the skin (Merkel cell, Ruffini ending, Meissner corpuscle, Pacinian corpuscle). The second one is linked to the sensation of force/torque, position, motion/velocity provided by the muscles, tendons, and the mechanoreceptors in the joints. Haptics is also involved in the perception of self-motion since it contributes to the proprioceptive system (i.e. perception of one's own body). Thus, the perception of acceleration, speed or any body model could be assimilated as a haptic effect. The frequency range is about 0-1 kHz depending on the type of modality. Most existing devices able to render haptic signals generate vibrations. Examples of such haptic actuators are linear resonant actuator (LRA), eccentric rotating mass (ERM), and voice-coil linear motor. These actuators may be integrated into haptic rendering devices such as haptic suits but also smartphones or game controllers.

To encode haptic signals, several formats have been defined related to either a high level description using XML-like formats (for example MPEG-V), parametric representation using json-like formats such as Apple Haptic Audio Pattern (AHAP) or Immersion Corporation's HAPT format, or waveform encoding (IEEE 1918.1.1 ongoing standardization for tactile and kinesthetic signals). The HAPT format has been recently included into the MPEG ISOBMFF file format specification (ISO/IEC 14496 part 12).

Moreover, GL Transmission Format (glTF™) is a royalty-free specification for the efficient transmission and loading of 3D scenes and models by applications. This format defines an extensible, common publishing format for 3D content tools and services that streamlines authoring workflows and enables interoperable use of content across the industry.

While the topic of kinesthetic data compression has received some attention in the context of bilateral teleoperation systems with kinesthetic feedback, the compression of vibrotactile information on the other hand remains fairly unaddressed. More generally, the adaption of the compression of a haptic signal according to the body part that is stimulated by a haptic actuator rendering the haptic signal has not yet been addressed.

The ongoing standardization process IEEE 1918.1.1 for tactile and kinesthetic signals is a first attempt at defining a standard coded representation.

Embodiments described hereafter have been designed with the foregoing in mind.

SUMMARY

Embodiments are related to a device and method for encoding a haptic signal of a haptic effect comprising a compression step, where the compression is based on the location where the haptic effect is to be performed thanks to a mapping between a location where the haptic effect is to be performed and a compression parameter, the location being based on body segmentation, or vertex-based or texture-based. Corresponding device and method for decoding are described.

A first aspect of at least one embodiment is directed to a method for decoding comprising obtaining information representative of a haptic effect, determining a location where to apply the haptic effect, determining a type of haptic effect, determining at least one compression parameter based on obtained location and type, decompressing a haptic signal associated with the haptic effect based on determined at least one compression parameter and decoding the decompressed haptic signal.

A second aspect of at least one embodiment is directed to a method for coding comprising obtaining a location where to apply a haptic effect, obtaining a type of haptic effect, obtaining a haptic signal associated with the haptic effect, determining at least one compression parameter based on obtained location and type, compressing the haptic signal based on the determined at least one compression parameter, generating information representative of the haptic effect and encoding the compressed haptic signal and information generated.

A third aspect of at least one embodiment is directed to an apparatus for decoding a haptic signal comprising a processor configured to obtain information representative of a haptic effect, determine a location where to apply the haptic effect, determine a type of haptic effect, determine at least one compression parameter based on obtained location and type, decompress a haptic signal associated with the haptic effect based on determined at least one compression parameter and decode the decompressed haptic signal.

A fourth aspect of at least one embodiment is directed to an apparatus for encoding a haptic signal comprising a processor configured to obtain a location where to apply a haptic effect, obtain a type of haptic effect, obtaining a haptic signal associated with the haptic effect, determining at least one compression parameter based on obtained location and type, compress the haptic signal based on the determined at least one compression parameter, generate information representative of the haptic effect and encode the compressed haptic signal and information generated.

A fifth aspect of at least one embodiment is directed to a signal comprising information representative of a haptic effect and compressed haptic signal generated according to the second aspect.

According to a sixth aspect of at least one embodiment, a computer program comprising program code instructions executable by a processor is presented, the computer program implementing at least the steps of a method according to the first or second aspect.

According to a seventh aspect of at least one embodiment, a computer program product which is stored on a non-transitory computer readable medium and comprises program code instructions executable by a processor is presented, the computer program product implementing at least the steps of a method according to the first or second aspect.

BRIEF DESCRIPTION OF THE DRAWINGS

FIG. 4 illustrates an example of definition of the body parts according to the OHM format.

FIG. 6 illustrates examples of combinations of body parts using a binary mask according to the Object OHM format.

FIGS. 7A, 7B and 7C show different examples of grouping for body parts according to elements of FIG. 6.

FIG. 10 illustrates a mapping of compression parameters for a haptic signal based on body segmentation according to at least one embodiment.

DETAILED DESCRIPTION

Figure 1:
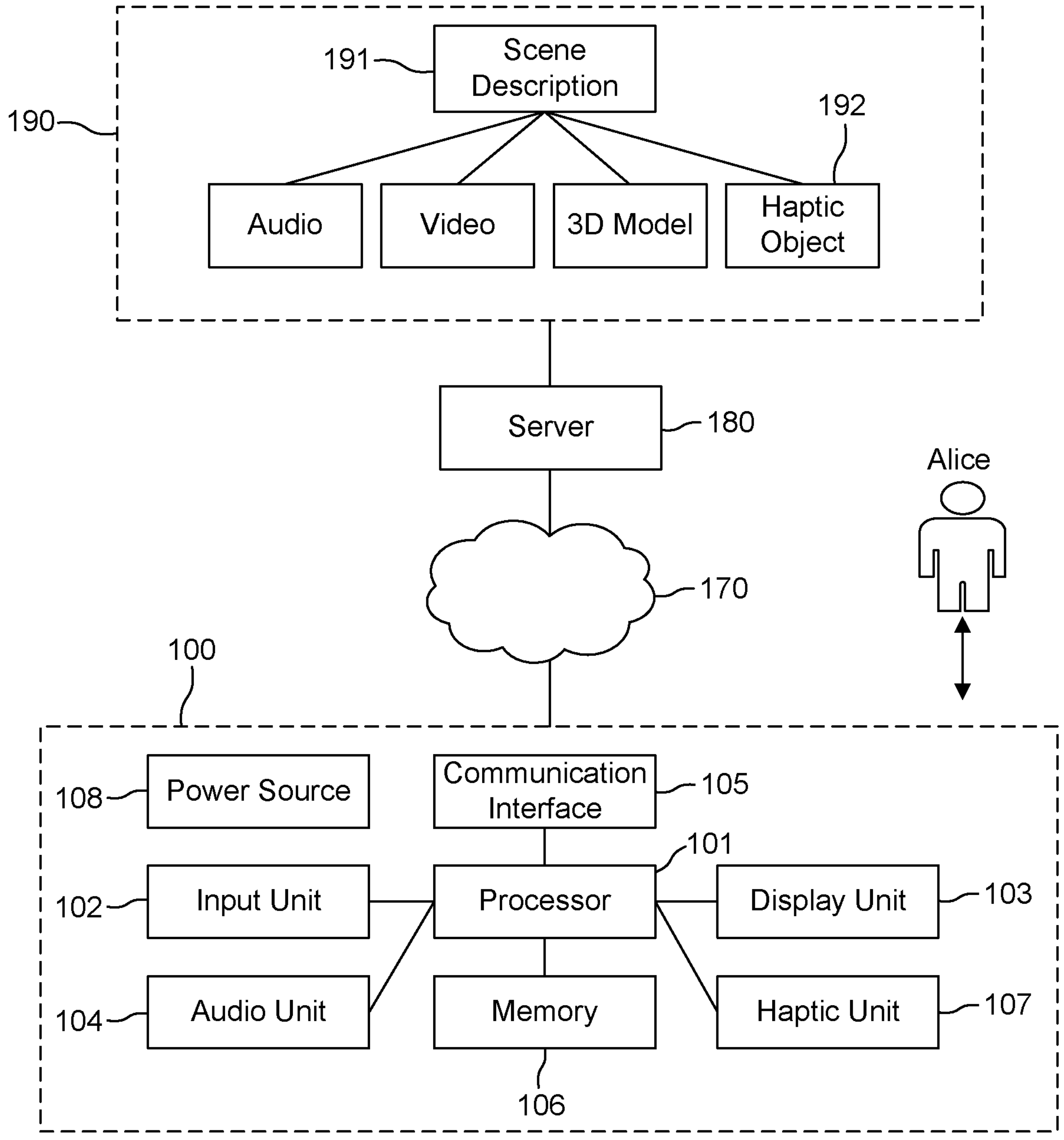
FIG. 1 illustrates a block diagram of an example of a system in which various aspects and embodiments are implemented.

FIG. 1 illustrates a block diagram of an example of system in which various aspects and embodiments are implemented. In the depicted immersive system, the user Alice uses the haptic rendering device 100 to interact with a server 180 hosting an immersive scene 190 through a communication network 170. This immersive scene 190 may comprise various data and/or files representing different elements (scene description 191, audio data, video data, 3D models, and haptic object 192) required for its rendering.

The haptic rendering device comprises a processor 101. The processor 101 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform data 20 processing such as haptic signal decoding, input/output processing, and/or any other functionality that enables the device to operate in an immersive system.

The processor 101 may be coupled to an input unit 102 configured to convey user interactions. Multiple types of inputs and modalities can be used for that purpose. Physical keypad or a touch sensitive surface are typical examples of input adapted to this usage although voice control could also be used. In addition, the input unit may also comprise a digital camera able to capture still pictures or video. The processor 101 may be coupled to a display unit 103 configured to output visual data to be displayed on a screen. Multiple types of displays can be used for that purpose such as a liquid crystal display (LCD) or organic light-emitting diode (OLED) display unit. The processor 101 may also be coupled to an audio unit 104 configured to render sound data to be converted into audio waves through an adapted transducer such as a loudspeaker for example. The processor 101 may be coupled to a communication interface 105 configured to exchange data with external devices. The communication preferably uses a wireless communication standard to provide mobility of the haptic rendering device, such as cellular (e.g. LTE) communications, Wi-Fi communications, and the like. The processor 101 may access information from, and store data in, the memory 106, that may comprise multiple types of memory including random access memory (RAM), read-only memory (ROM), a hard disk, a subscriber identity module (SIM) card, a memory stick, a secure digital (SD) memory card, any other type of memory storage device. In embodiments, the processor 101 may access information from, and store data in, memory that is not physically located on the device, such as on a server, a home computer, or another device.

The processor 101 may be coupled to a haptic unit 107 configured to provide haptic feedback to the user, the haptic feedback being described in a haptic object 192 that is part of a scene description 191 of an immersive scene 190. The haptic feedback describes the kind of feedback to be provided according to the syntax described further hereinafter. Such description file is typically conveyed from the server 180 to the haptic rendering device 100. The haptic unit 107 may comprise a single haptic actuator or a plurality of haptic actuators located at a plurality of positions on the haptic rendering device. Different haptic units may have a different number of actuators and/or the actuators may be positioned differently on the haptic rendering device.

The processor 101 may receive power from the power source 108 and may be configured to distribute and/or control the power to the other components in the haptic rendering device 100. The power source may be any suitable device for powering the device. As examples, the power source may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

While the figure depicts the processor 101 and the other elements 102 to 108 as separate components, it will be appreciated that these elements may be integrated together in an electronic package or chip. It will be appreciated that the haptic rendering device 100 may include any sub-combination of the elements described herein while remaining consistent with an embodiment. The processor 101 may further be coupled to other peripherals or units not depicted in FIG. 1 which may include one or more software and/or hardware modules that provide additional features, functionality and/or wired or wireless connectivity. For example, the peripherals may include peripherals such as a universal serial bus (USB) port, a vibration device, a television transceiver, a hands free headset, a Bluetooth® module, a frequency modulated (FM) radio unit, a digital music player, a media player, a video game player module, an Internet browser, and the like. For example, the processor 101 may be coupled to a localization unit configured to localize the haptic rendering device within its environment. The localization unit may integrate a GPS chipset providing longitude and latitude position regarding the current location of the haptic rendering device but also other motion sensors such as an accelerometer and/or an e-compass that provide localization services.

Typical examples of haptic rendering device 100 are haptic suits, smartphones, game controllers, haptic gloves, haptic chairs, haptic props, motion platforms, etc. However, any device or composition of devices that provides similar functionalities can be used as haptic rendering device 100 while still conforming with the principles of the disclosure.

In at least one embodiment, the device does not include a display unit but includes a haptic unit. In such embodiment, the device does not render the scene visually but only renders haptic effects. However, the device may prepare data for display so that another device, such as a screen, can perform the display. Examples of such devices are haptic suits or motion platforms.

In at least one embodiment, the device does not include a haptic unit but includes a display unit. In such embodiment, the device does not render the haptic effect but only renders the scene visually. However, the device may prepare data for rendering the haptic effect so that another device, such as a haptic prop, can perform the haptic rendering. Examples of such devices are smartphones, head-mounted display, or laptops.

In at least one embodiment, the device does not include a display unit nor does it include a haptic unit. In such embodiment, the device does not visually render the scene and does not render the haptic effects. However, the device may prepare data for display so that another device, such as a screen, can perform the display and may prepare data for rendering the haptic effect so that another device configured to render the haptic effect, such as a haptic prop, can perform the haptic rendering. In this case, the prepared data is then provided to the haptic rendering device through a communication channel such as the communication interface 105. Examples of such devices are desktop computers, optical media players, or set-top boxes.

In at least one embodiment, the immersive scene 190 and associated elements are directly hosted in memory 106 of the haptic rendering device 100 allowing local rendering and interactions.

Although the different elements of the immersive scene 190 are depicted in FIG. 1 as separate elements, the principles described herein apply also in the case where these elements are directly integrated in the scene description and not separate elements. Any mix between two alternatives is also possible, with some of the elements integrated in the scene description and other elements are separate files.

Figure 2:
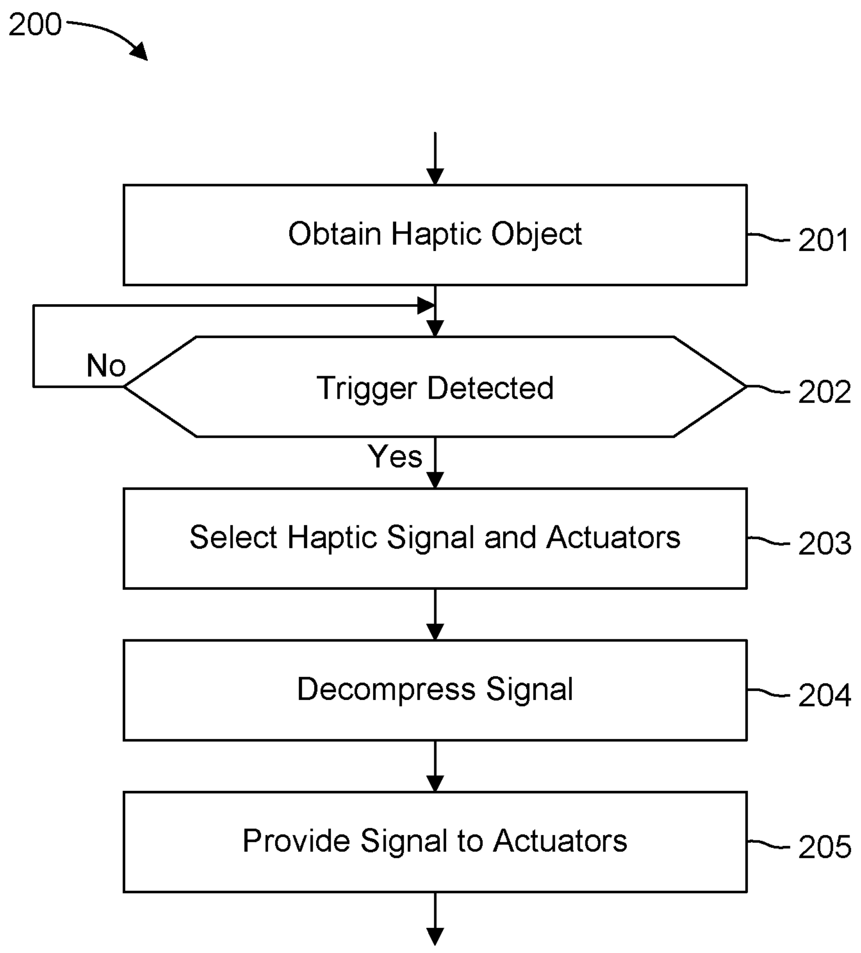
FIG. 2 illustrates an example flowchart of a process for rendering a haptic feedback description file according to at least one embodiment.

FIG. 2 illustrates an example flowchart of a process for rendering a haptic feedback description file according to at least one embodiment. Such process 200 is typically implemented in a haptic rendering device 100 and executed by a processor 101 of such device. In step 201, the processor obtains a description of an immersive scene (191 in FIG. 1). This may be done for example by receiving it from a server through a communication network, by reading it from an external storage device or a local memory, or by any other means. The processor analyses the scene description file in order to extract the haptic object (192 in FIG. 1) that allows to determine the parameters related to the haptic effect and more particularly the haptic volume associated with the haptic effect. In step 202, the processor monitors a position within the immersive scene of an avatar representing the user interacting with the immersive scene (or a part of the body of an avatar) to detect an intersection (object collision) with the haptic volume. Collision detection may be performed for example by a dedicated physics engine specialized in this task. When such intersection is detected, in step 203, the processor extracts parameters from the haptic object allowing to select which haptic signal needs to be applied on which actuator or set of actuators. In step 204, the processor decompresses the haptic signal according to at least one embodiment described herein. In step 205, the processor controls the haptic unit to apply the selected haptic signal to the haptic actuator or set of actuators and thus render the haptic feedback according to the information of the haptic object.

As discussed above, some devices do not perform the rendering themselves but delegate this task to other devices. In this case, data is prepared for the rendering of the visual element and/or of the haptic effect and transmitted to the device(s) performing the rendering.

In a first example, the immersive scene description 191 may comprise a virtual environment of an outdoor camp site where the user can move an avatar representing him. A first haptic feedback could be a breeze of wind that would be present anywhere in the virtual environment and generated by a fan. A second haptic feedback could be a temperature of 30° C. when the avatar is in proximity of a campfire. This effect would be rendered by a heating element of a haptic suit worn by the user executing the process 200. However, this second feedback would only be active when the position of the user is detected as being inside the haptic volume of the second haptic object. In this case the haptic volume represents the distance to the fire where the user feels the temperature.

In another example, the immersive scene description 191 may comprise a video of a fight between two boxers and, the user wearing a haptic suit, the haptic effect may be a strong vibration on the chest of the user when one of the wrestlers receives a punch.

Figure 3:
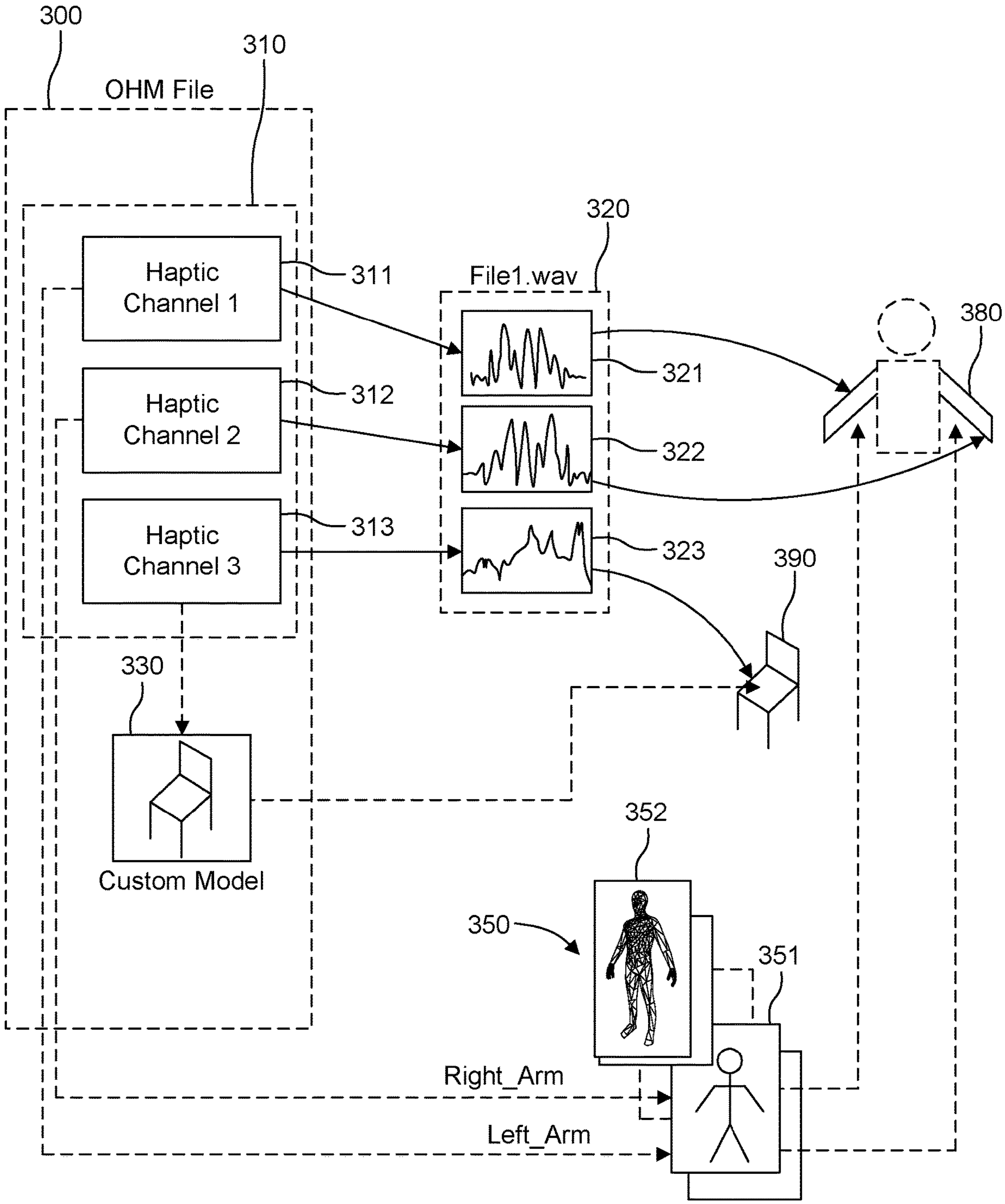
FIG. 3 illustrates an example of a data organization of a haptic feedback description file where the haptic effect is localized.

FIG. 3 illustrates an example of data organization of a haptic feedback description file where the haptic effect is localized. Such description is for example based on the Object Haptic Metadata (OHM) file format that defines the syntax elements allowing to describe a haptic effect to be applied at a defined location of the user's body. This format is for example described in the international patent application PCT/EP2021/074515. However, the description can also be based on the glTF™ file format as described in the European patent application 21306241.7.

In this example, a first haptic rendering device is a haptic vest 380 where only the two sleeves comprise haptic actuators to render vibrations. A second haptic rendering device is a haptic chair 390, also able to render vibrations.

First, the haptic effect to be rendered is described in a haptic feedback description file 300. According to at least one embodiment, this file uses the aom file format and syntax. In this example, one haptic object 310 is present in the haptic feedback description file 300. However, as introduced above, a haptic feedback description file may comprise multiple haptic objects.

The haptic object 310 comprises three haptic channels 311, 312, 313. The haptic channel 311 is associated with a geometric model 351 (avatar_ID) selected from the set of standard generic predefined geometric models 350 and more precisely to the left arm of the geometric model 351 (body_part_mask corresponding to left arm). The haptic channel 311 is also associated with the audio file 320 and more particularly with the first channel of the audio file comprising the audio signal 321. Thus, the haptic rendering device 380 is then able to select the audio signal 321 to be applied to the haptic actuators of the left arm. Similarly, for the right arm, as defined by the information of the second haptic channel 312, the audio signal 322 (second channel of the audio file) will be applied to the haptic actuators of the right arm, allowing the render on the haptic vest 380 the vibration as defined in the haptic feedback description file 300.

The same principle applies to the haptic chair 390 with the difference that it uses a custom avatar_ID. Indeed, its geometry is not part of the set of generic geometric models. Therefore, the corresponding geometry is defined as a custom avatar_ID 330 within the haptic feedback description file 300. The third audio signal 323 is selected to be applied to the actuators of the haptic chair 390.

The association between the haptic channels and the audio channels is implicit and is done according to the order of appearance. The first haptic channel of a haptic object will be associated with the first audio channel of the audio file (explicitly) associated with the haptic object.

In a second example (not illustrated) of data organization for a haptic feedback description file according to at least one embodiment, the file comprises two different haptic objects. Therefore, the haptic channels are in different haptic objects. In this case, it is possible to use two different audio files file1.wav and file2.wav.

The set of models 350 typically represent the geometry of human bodies with different levels of details and thus provide different levels of precision. It can be applied to any kind of geometric model (animal, object, etc.). In the figure, the precision of geometric model 351 is much lower than the detailed mesh of geometric model 352.

FIG. 4 illustrates an example of definition of the body parts according to the OHM format. In the table of this figure, the first column identifies a body_part_ID, the second column describes the name of the body part, the third column defines the binary mask value for the body part and the fourth column shows the equivalent hexadecimal value of the mask. A body part ID is assigned to a face of a geometric model (for example last line of FIG. 7). Therefore, the faces of a common body part are grouped together, in order to be selected efficiently.

Figure 5:
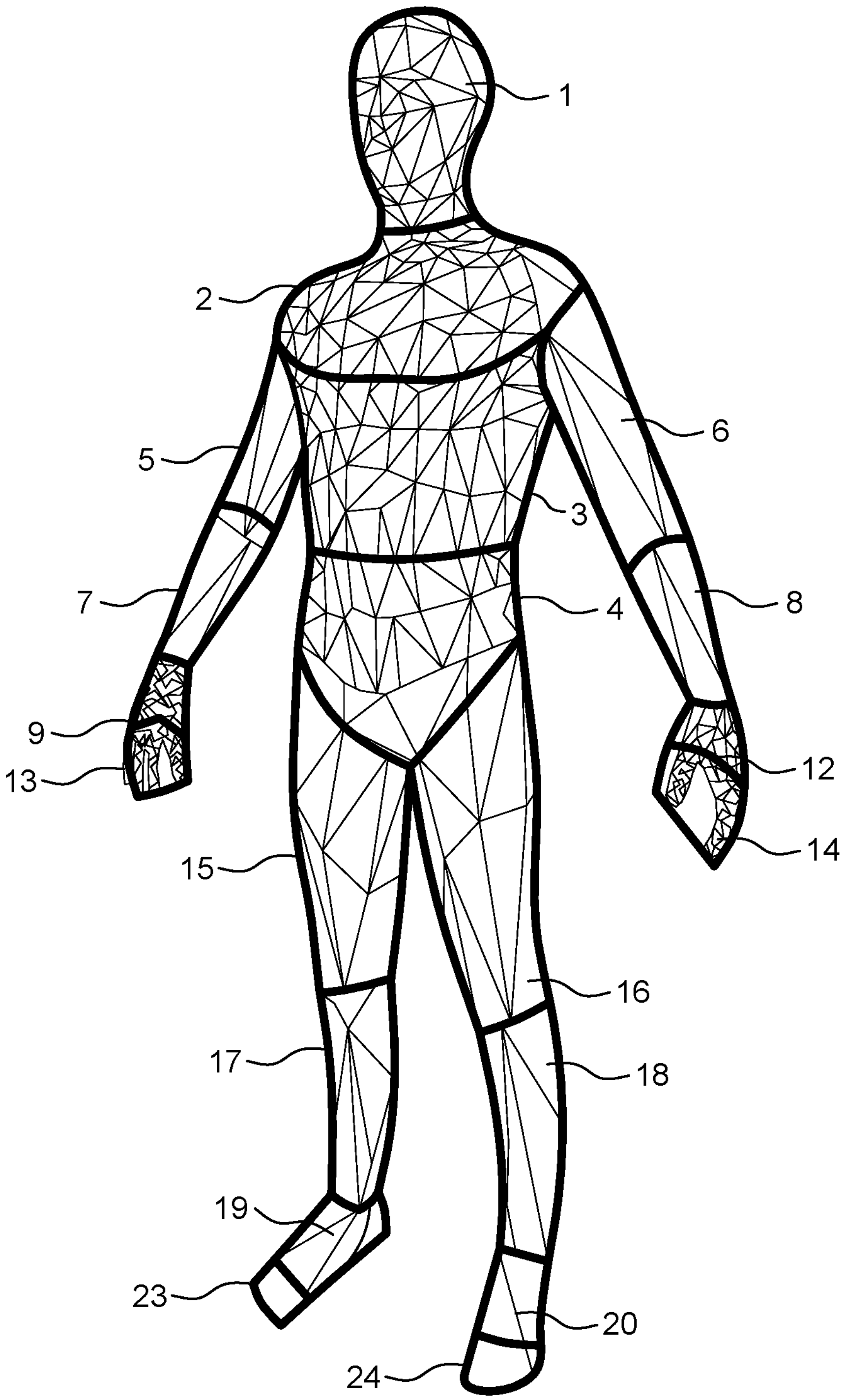
FIG. 5 illustrates an example of mapping of the body parts on a generic geometric body model of the set of models 350 of FIG. 3.

FIG. 5 illustrates an example of mapping of the body parts on a generic geometric body model of the set of models 350 of FIG. 3. It shows the body_part_ID (first column of FIG. 8) overlaid on the different body parts of the model (1 for the head, 2 for the chest, etc.). Not all elements of FIG. 4 are illustrated.

FIG. 6 illustrates examples of combinations of body parts using a binary mask according to the Object OHM format. The first column of the table corresponds to the name of the body part, the second column defines the binary mask value for the body part and the third column shows the equivalent hexadecimal value of the mask.

As seen above, a body part is associated with a binary mask (third column). This provides a convenient way to combine multiple body parts. For example, the upper body corresponds to grouping the body parts with IDs 1 to 14. This combination is performed by a bitwise OR operation over the masks of the different body parts to get the corresponding mask value. Therefore, a binary mask of 00000000001111111 (0x003FFF in hex value) allows to easily group the body parts with IDs 1 to 14 and thus represents the complete upper body in a very efficient manner. This grouping is shown in FIG. 7A, while FIG. 7B shows the grouping for the left leg (mask=0xAA8000) and FIG. 7C shows the grouping for the right arm (mask value 0x001550).

In this document, the notion of "location" where the haptic effect is to be applied corresponds to a determined segmentation of the body (such as body parts of FIG. 5) or to a vertex or a set of vertices of a geometric model (such as the haptic chair 390 of FIG. 3). It is essential to localize within a rendering device which haptic actuator will receive the haptic signal and thus will render the haptic effect. In the example where the rendering device is a haptic suit, the location can thus be expressed as a location on a human body model since a human user will wear the haptic suit and the correspondence between the haptic actuators and the body model will be effective.

Immersive scenes may comprise multiple haptic effects comprising different haptic signals, such as the signals 321, 322 and 323 of FIG. 3. These signals need to be transmitted to the haptic rendering device 100 of FIG. 1 and can require a large amount of data, thus requiring significant bandwidth, especially for complex immersive scenes. This is particularly critical in the case where a large number of haptic rendering devices interact with one server. Therefore, haptic signals may be compressed to optimize their distribution. Existing compression techniques relying on conventional mechanisms may be applied to haptic signals.

Figure 8:
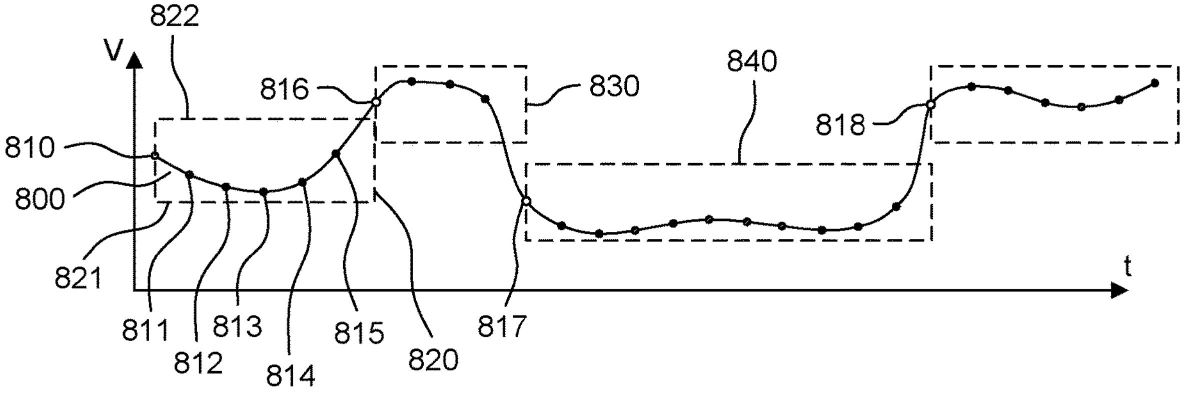
FIG. 8 illustrates a technique for compressing a waveform signal based on the concept of perceptual deadbands.

FIG. 8 illustrates a technique for compressing a waveform signal based on the concept of perceptual deadbands. This technique is for example used for compressing kinesthetic or vibrotactile signals and is based on the notion of perception threshold: samples within a so-called deadband can be dropped as the associated signal change is too small to be perceptible. Indeed, according to Weber's law of Just Noticeable Difference (JND), a signal change is perceivable (and thus needs to be transmitted) only if the relative difference between two subsequent stimuli exceeds the JND. In mathematical terms, the signal change is perceptible only if:

$$\left|\frac{\Delta I}{I}\right| \geq k$$

where I is the intensity of the last transmitted sample and ΔI is the difference between the current sample and the last transmitted sample. k is called the Weber fraction and may also be represented by the corresponding percentage value.

This principle is illustrated in the FIG. 8. In this figure, the horizontal axis is the temporal axis while the vertical axis represents the value of the signal. The signal to compress is represented by the curve 800. The white dots and black dots represent the sampling values of the signal. When acquiring the first sample value 810, its value needs to be transmitted. A lower threshold 821 and upper threshold 822 are defined, relative to the value of the sample 810 and based on the Weber fraction. For example, with a sample value of 150 and a Weber fraction of 10%, the lower threshold 821 is set to 135 (150−150/10) and the upper threshold 822 is set to 165 (150+150/10). While the sampled values are comprised between the thresholds 821 and 822, there is no need to transmit these samples since the signal change is considered to be too small to be perceptible. This is the case for the samples 811, 812, 813, 814 and 815. The sample 816 being outside of the currently defined threshold area 820, i.e. greater than 165, its value needs to be transmitted. The same applies to sample 817, outside of threshold area 830 that is based on the value of sample 816. The same applies also for the sample 818 outside of threshold area 840. Therefore, the original set of 28 samples data can be reduced by removing all the samples (represented by black dots) that are close enough to the previous transmitted sample (represented by white dots).

However, in the particular case of kinesthetic data, the Weber fraction depends on the type of kinesthetic data as illustrated in table 1 that shows the sensory resolution and Weber fractions for a range of tactile and haptic stimuli extracted from Jones, L. A. (2012), "Application of Psychophysical Techniques to Haptic Research".

TABLE 1

| Variable | Resolution | Weber Fraction |
|---|---|---|
| Surface texture (roughness) | 0.06 μm | 5-12% |
| Curvature | 9 μm | 10% |
| Temperature | 0.02-0.09° C. | 0.5-2% |
| Skin indentation | 11.2 μm | 14% |
| Velocity of tactile stimuli | — | 20-25% |
| Vibrotactile frequency (5-200 Hz) | 0.3 Hz | 3-30% |
| Vibrotactile amplitude (20-300 Hz) | 0.03 μm | 13-16% |
| Pressure | 5 gm/mm | 4-16% |
| Force | 19 mN | 7% |
| Tangential force | | 16% |
| Stiffness/compliance | | 15-22% |

TABLE 1-continued

| Variable | Resolution | Weber Fraction |
|---|---|---|
| Viscosity | | 19-29% |
| Friction | | 10-27% |
| Electric current | 0.75 mA | 3% |
| Moment of inertia | | 10-113% |

In this table, the first column lists different types of haptic data. The second column gives the resolution for a type of stimulus. The resolution corresponds to the absolute threshold: it is the smallest amount of stimulus energy necessary to produce a sensation. The third column lists the Weber fraction expressed in percentage. The value of the Weber fraction may vary for different subjects and with various parameters (e.g. location on the body, temperature, humidity, etc.), thus it is expressed as an average or interval.

These methods based on perceptual deadband can be used both for offline compression and for live streaming of haptic compressed data.

In addition, for offline data compression of vibrotactile signals, existing compression methods similar to audio compression techniques may be used, for example relying on Discrete Cosine Transform or Fourier Transform to compress the data by removing unnecessary frequencies. Each type of haptic stimuli (e.g. vibration, kinesthetic, temperature, etc.) is associated with at least one specific mechanoreceptor (Pacinian corpuscles, Meissner's corpuscles, Merkel cells, Ruffini corpuscles) which presents a limited range of perceptible frequencies as illustrated in Table 2. The data can be compressed by discarding non relevant information associated with non-perceivable frequencies (DCT coefficients for instance). Additionally, the remaining data (DCT coefficients of perceived frequencies for instance) may then be quantized based on Weber's law of JNDs.

Table 2 shows the characteristics of mechanoreceptors of the human body. The first column is the name of different mechanoreceptors. For each mechanoreceptor, the second column gives their type: Slowly Adapting (SA) of type 1 or 2 and Rapidly Adapting (RA) of type 1 or 2. The third column lists the frequency range of stimuli achievable, the fourth column specify the spatial accuracy of the receptor on the skin and the fifth column describes their role.

TABLE 2

| Name | Type | Frequency | Area | Role |
|---|---|---|---|---|
| Merkel cell | SA-I | 0-10 Hz | Small | Pressure, edge |
| Ruffini copr. | SA-II | 0-10 Hz | Large | Skin stretch |
| Meissner corp | RA-I | 20-50 Hz | Small | Pressure |
| Pacini corp. | RA-II | 100-300 Hz | Large | Deep pressure, vibration |

Figure 9:
FIG. 9 illustrates a representation of the sensibility of a human body to haptic stimuli.

FIG. 9 illustrates a representation of the sensibility of a human body to haptic stimuli. Indeed, the sensitivity to haptics and the range of perceived frequencies depends not only on the type of haptic stimuli but also on the location on the body. Some body areas have a much higher number of haptic receptors than others and are more sensitive to some frequencies. The figure (from https://en.wikipedia.org/wiki/Cortical_homunculus) shows a distorted representation of the human body, based on a map of the areas and proportions of the human brain dedicated to processing sensory functions for different parts of the body. It clearly shows that fingers are much more sensitive than upper arms for example. Therefore, when interacting with an immersive environment comprising haptic signals to be applied on different elements of the body, the haptic signals can be compressed in correspondence with this perception to prevent a waste of transmission bandwidth and/or storage space.

Therefore, in at least one embodiment, the haptic signal of a haptic effect is compressed based on the location where the haptic effect is to be applied. For example, the compression of a haptic signal for an upper arm may be more severe than the compression of a haptic signal for a finger since the sensitivity in this body area is lower than on the finger. This is possible thanks to a mapping, for a type of effect, between locations where the haptic effect is to be performed and compression parameters. The location where the haptic effect is to be performed is for example based on body segmentation, or vertex-based or texture-based. The compression may also take into account the type of signal. Example of compression parameters are the Weber fraction or a maximal frequency of the haptic signal.

FIG. 10 illustrates a mapping of compression parameters for a haptic signal based on body segmentation according to at least one embodiment. In this embodiment, a mapping of the compression parameters with regards to the different body parts adapts the compression of the haptic signal according to the principles introduced above or other arbitrary choices. Such mapping may be known by the encoder and the decoder or may be customized for specific purposes and provided along with metadata related to the haptic effect.

In the FIG. 10, the first column identifies the location on the body using the body segmentation introduced in FIG. 5, the second column determines, for a given body part number, the Weber fraction (expressed as a percentage) that may be used for compressing the haptic signal in case of kinesthetic signal and the third column determines the maximal frequency to be used.

In at least one embodiment, it is thus proposed to define a mapping between the different body parts and the associated compression effect.

When the compression parameters mapping is customized, a definition of this mapping may be added to the definition of a haptic object using the OHM file format syntax. This can be done by specifying a compression parameter in the definition of a body part, as illustrated in the syntax of table 3.

TABLE 3

| Syntax | No. of bytes | Data format |
|---|---|---|
| avatar_description ( ) { | | |
| format_version | 2 | unsigned int |
| avatar_ID | 2 | unsigned int |
| lod | 2 | unsigned int |
| type | 32 | char |
| for (i=0; i<number_of_mappings; i++) { | | |
| mapping_id | 4 | unsigned int |
| description_string | 32 | char |
| for (i=0; i<24; i++) { | | |
| compression_parameter | 4 | float |
| } | | |

This compression parameter mapping may also be added to the definition of a haptic object using the glTF™ file format syntax by the definition of a section dedicated to the mapping, as illustrated in the syntax of table 4.

TABLE 4

```
{
  "$schema": "http://json-schema.org/draft-04/schema",
  "title": "IDCC_Haptics_avatar",
  "type": "object",
  "description": "A haptic avatar.",
  "allOf": [ { "$ref": "glTFChildOfRootProperty.schema.json" } ],
  "properties": {
    "id": {
      "type": "number",
      "description": "ID for the avatar description (one may have one mesh
resolution per type of haptic signal) .",
      "minimum": 0.0,
      "default": 0.0
    },
    "lod": {
      "type": "integer",
      "description": "Number specifying the level of details of the avatar: 0,
1 or 2 for respectively low, average and high resolution. It allows to use more or
less complex representations.",
      "anyOf": [
        {
          "enum": [ 0 ],
          "Low": "low-level lod representation."
        },
        {
          "enum": [ 1 ],
          "Average": "average-level lod representation."
        },
        {
          "enum": [ 2 ],
          "High": "high-level lod representation."
        },
        {
          "type": "integer"
        }
      ]
    },
    "type": {
      "type": "integer",
```

TABLE 4-continued

```
        "description": "Specifies the type of haptic perception represented by the
avatar. It refers to a generic model except for Custom (3) where the mesh is provided
in the gltf buffer of this node",
        "anyOf": [
          {
            "enum": [ 0 ],
            "Vibration": "Human body model representing vibration spatial
acuity."
          },
          {
            "enum": [ 1 ],
            "Pressure": "Human body model representing pressure spatial
acuity."
          },
          {
            "enum": [ 2 ],
            "Temperature": "Human body model representing temperature spatial
acuity.."
          },
          {
            "enum": [ 3 ],
            "Custom": "Custom human body model. Mesh is provided in the gltf
buffer."
          },
          {
            "type": "integer"
          }
        ]
      },
      "mappings": {
        "type": "array",
        "description": "List of compression mappings",
        "items": {
          "type": "object"
          "properties": {
            "id": {
              "type": "integer",
              "description": "Compression mapping id"
            },
            "compression_parameter_type": {
              "type": "string",
              "description": "Type of the compression parameter (JND,
frequency, other)"
            },
            "parameters": {
              "type": "array",
              "items": {
                "type": "number",
                "description": "Value of the compression parameter of
a body part"
              }
            }
          }
        }
      },
      "name": { },
      "extensions": { },
      "extras": { }
    },
    "required": [
      "type",
      "lod",
      "id"
    ]
}
```

When building the file, the creator decides which type of compression is the best for a given signal and thus chooses between Weber fraction (JND) or maximal frequency for example.

Table 5 illustrates an example of usage of the mapping for a vibration effect, according to the glTF™ file format syntax. In this example, the signal is using a "somefile.wav" waveform haptic signal that is compressed using a maximal frequency defined in a "mapping" section. The compression parameter is identified as being the "frequency" and the maximal frequencies for a body part are determined in the "parameters" array. These parameters correspond to the elements of the third column of FIG. 10.

TABLE 5

```
{
  "IDCCHaptics" : {
    "signals" : [
      {
        "signal_type" : "Vibration",
        "sampling_rate" : 0,
        "bit_depth" : 0,
        "nb_channels" : 1,
        "avatar_id" : -1,
        "signal_file" : "somefile.wav",
        "description" : "Vibration_effect",
        "encoder" : "Lossy"
        "effect_list" : [
        ],
        "channel_list" : [
          {
            "channel_id" : -1,
            "gain" : 1,
            "mixing_weight" : 1,
            "body_part_mask" : 1048576,
            "description" : "Right hand finger",
            "effect_timeline" : [
            ],
            "property_timeline" : [
            ]
          }
        ]
      }
    ],
    "avatars" : [
      {
        "id" : 0,
        "lod" : "Average",
        "type" : "Vibration"
        "mappings" : [
          {
            "id":0,
            "compression_parameter_type":"frequency",
"parameters": [ 300, 100, 100, 100, 200, 200, 150, 150, 100, 100, 100, 100, 100, 100, 200, 200, 200,
200, 150, 150, 150, 150, 150, 150]
          }
        ]
      }
    ],
    "shape" : "Custom",
    "description" : "Carpet texture"
  }
}
```

In at least one embodiment, different mappings may be defined and used to adapt to changes in the virtual or real environment corresponding to different situations. For example, when the temperature increases, the user may start sweating. In such situation, the compression parameters may be adapted since the sensitivity varies with the humidity level.

At least one embodiment relates to mapping of compression parameters for a vertex-based haptic signal. In such embodiment, a mapping of the compression parameters with regard to a vertex of the avatar (i.e. body model) adapts the compression of the haptic signal according to the principles introduced above. This allows a much more precise tuning of the signal compression.

When the compression parameters mapping is customized and the mesh representation of the avatar is provided as an external file, this data can be encoded directly in the mesh for example by using the color information of a vertex. Color is conventionally encoded over a specific range (for example between 0 and 1 or between 0 and 255). To convey compression parameters, it is necessary to specify the correspondence of the values for a type of parameter in order to rescale the data properly.

In at least one embodiment, this correspondence is predetermined and known both by the encoder and the decoder. The table 6 illustrates a range of possible values for correspondence of the maximal frequency and Weber fraction compression parameters.

TABLE 6

| Compression map | Range |
|---|---|
| Maximal Stimuli Frequency | 0-1000 Hz |
| Weber Fraction | 0-100% |

Using this table, it is possible to express compression parameters in terms of color values. For example, if a Weber fraction of 8% needs to be carried over for a vertex using an 8-bit color space, the numerical value 20 (=8% of 255) will be indicated as the color for the vertex.

In at least one embodiment, the correspondence of the values for a type of parameter may be customized for specific purposes and provided along with metadata related to the haptic effect. This correspondence may be conveyed in the definition of a haptic object using the glTF™ file format syntax by specifying a section dedicated to the mapping, as illustrated in the syntax of table 7, where the data referenced by the accessor contains the compression parameters associated with a vertex of the mesh.

TABLE 7

```
{
  "$schema": "http://json-schema.org/draft-04/schema",
  "title": "IDCC_Haptics_avatar",
  "type": "object",
  "description": "A haptic object.",
  "allOf": [ { "$ref": "glTFChildOfRootProperty.schema.json" } ],
  "properties": {
    "id": {
      "type": "number",
      "description": "ID for the avatar description (one may have one mesh
resolution per type of haptic signal).",
      "minimum": 0.0,
      "default": 0.0
    },
    "lod": {
      "type": "integer",
      "description": "Number specifying the level of details of the avatar: 0,
1 or 2 for respectively low, average and high resolution. It allows to use more or
less complex representations.",
      "anyOf": [
        {
          "enum": [ 0 ],
          "Low": "low-level lod representation."
        },
        {
          "enum": [ 1 ],
          "Average": "average-level lod representation."
        },
        {
          "enum": [ 2 ],
          "High": "high-level lod representation."
        },
        {
          "type": "integer"
        }
      ]
    },
      "type": {
      "type": "integer",
      "description": "Specifies the type of haptic perception represented by
the avatar. It refers to a generic model except for Custom (3) where the mesh is
provided in the gltf buffer of this node",
      "anyOf"
        {
          "enum": [ 0 ],
          "Vibration": "Human body model representing vibration spatial
acuity."
        },
        {
          "enum": [ 1 ],
          "Pressure": "Human body model representing pressure spatial
acuity."
        },
        {
          "enum": [ 2 ],
          "Temperature": "Human body model representing temperature
spatial acuity .."
        },
        {
          "enum": [ 3 ],
          "Custom": "Custom human body model. Mesh is provided in the gltf
buffer."
        },
        {
          "type": "integer"
        }
```

TABLE 7-continued

```
        ]
      },
      "mappings": {
        "type": "array",
        "description": "List of compression mappings",
        "items": {
          "type": "object"
          "properties": {
            "id": {
              "type": "integer",
              "description": "Compression mapping id"
            },
            "compression_parameter_type": {
              "type": "string",
              "description": "Type of the compression parameter (JND,
frequency, other)"
              },
              "compression_parameter_range_min": {
                "type": "number",
                "default": 0.0,
                "description": "minimal value"
              },
              "compression_parameter_range_max": {
                "type": "number",
                "description": "maximal value"
            },
              "parameters_accessor": {
                "allOf": [ { "$ref": "glTFid.schema.json" } ],
                "description": "The index of an accessor containing the data
compression parameters."
              }
          }
        }
      },
      "mesh": {
        "allOf": [ { "$ref": "mesh.schema.json" } ],
        "description": "The mesh associated with an avatar."
      },
      "name": { },
      "extensions": { },
      "extras": { }
    },
    "required": [
      "type",
      "lod",
      "id"
    ]
}
```

Table 8 shows an example of compression mapping correspondence information using vertex information based on the glTF™ file format syntax where the maximal frequency of 1000 Hz is set for the vibration.

TABLE 8

```
{
  "IDCCHaptics" : {
    "signals" : [
      {
        "signal_type" : "Vibration",
        "sampling_rate" : 0,
        "bit_depth" : 0,
        "nb_channels" : 1,
        "avatar_id" : -1,
        "signal_file" : "someFile.wav",
        "description" : "Vibration effect",
        "encoder" : "Lossy",
        "effect_list" : [
        ],
        "channel_list" : [
          {
            "channel_id" : -1,
            "gain" : 1,
            "mixing_weight" : 1,
            "body_part_mask" : 1048576,
```

TABLE 8-continued

```
            "description" : "Right hand finger",
            "effect_timeline" : [
            ],
            "property_timeline" : [
            ]
          }
        ]
      }
    ],
    "avatars" : [
      {
        "id" : 0,
        "lod" : "Average",
        "type" : "Vibration"
        "mappings" : [
          {
            "id":0,
            "compression_parameter_type" : "frequency",
            "compression_parameter_range_max":1000,
            "parameters_accessor":0
          }
        ]
```

TABLE 8-continued

```
      }
    ],
    "shape" : "Custom",
    "description" : "Carpet texture"
  }
}
```

At least one embodiment relates to mapping of compression parameters using a texture associated with the mesh of the avatar representation. Using a texture instead of only vertex information allows to have an even higher level of details. This can be particularly useful when interacting with virtual environments. Collisions with haptic objects can trigger haptic effect at very precise locations where there might be important variations of sensitivity (on the hands for instance). With a texture mapping, the retrieved compression parameter will be more precise than using only vertex-based information. A compression parameter value can thus be specified for a pixel of the texture associated with the mesh of the avatar representation. Similar to the vertex-based embodiment, correspondence between color and compression parameters maps needs to be specified as illustrated in table 9.

TABLE 9

| Compression map | Format | Range |
|---|---|---|
| Maximal stimuli frequency | 8-bit | 0-1000 Hz |
| Weber Fraction | 8-bit | 0-100% |

This correspondence may be conveyed in the definition of a haptic object using the glTF™ file format syntax by specifying a section dedicated to the mapping, as illustrated in the syntax of table 10. Each texture is defined by a gltf textureInfo.schema.json that is an ID of a texture in the glTF description file. Note that a custom texture is available where a user can put any kind of data in a texture format, which could be used for future extensions as well. The following modifications to the IDCC_Haptics_avatar glTF schema should also be done to reference the proper haptic maps.

TABLE 10

```
{
  "$schema": "http://json-schema.org/draft-04/schema",
  "title": "IDCC_Haptics_avatar",
  "type": "object",
  "description": "A haptic object.",
  "allOf": [ { "$ref": "glTFChildOfRootProperty.schema.json" } ],
  "properties": {
    "id": {
      "type": "number",
      "description": "ID for the avatar description (one may have one mesh
resolution per type of haptic signal) .",
      "minimum": 0.0,
      "default": 0.0
    "lod": {
      "type": "integer",
      "description": "Number specifying the level of details of the avatar:
0, 1 or 2 for respectively low, average and high resolution. It allows to use more
or less complex representations.",
      "anyOf":
        {
          "enum": [ 0 ],
          "Low": "low-level lod representation."
        },
        {
          "enum": [ 1 ],
          "Average": "average-level lod representation."
        },
        {
          "enum": [ 2 ],
          "High": "high-level lod representation."
        },
        {
          "type": "integer"
        }
      ]
    },
    "type": {
      "type": "integer",
      "description": "Specifies the type of haptic perception represented by
the avatar. It refers to a generic model except for Custom (3) where the mesh is
provided in the gltf buffer of this node",
      "anyOf": [
        {
          "enum": [ 0 ],
          "Vibration": "Human body model representing vibration spatial
acuity."
        },
        {
          "enum": [ 1 ],
          "Pressure": "Human body model representing pressure spatial
acuity."
        },
```

TABLE 10-continued

```
        {
          "enum": [ 2 ],
          "Temperature": "Human body model representing temperature
spatial acuity."
        },
        {
          "enum": [ 3 ],
          "Custom": "Custom human body model. Mesh is provided in the
gltf buffer."
        },
        {
          "type": "integer"
        }
      ]
    },
      "mappings": {
      "type": "array",
      "description": "List of compression mappings",
      "items": {
        "type": "object"
        "properties": {
          "id": {
            "type": "integer",
            "description": "Compression mapping id"
          },
          "compression_parameter_type": {
            "type": "string",
            "description": "Type of the compression parameter (JND,
frequency, other)"
          },
          "compression_parameter_range_min": {
            "type": "number",
            "default": 0.0,
            "description": "minimal value"
          },
          "compression_parameter_range_max": {
            "type": "number",
            "description": "maximal value"
          },
          "compression_map": {
            "allOf": [ { "$ref": "textureInfo.schema.json" } ],
            "description": "The texture containing compression
parameters associated to the avatar."
          }
        }
      }
    },
    "mesh": {
      "allOf": [ { "$ref": "mesh.schema.json" } ],
      "description": "The mesh associated with an avatar."
    "name": { },
    "extensions": { },
    "extras": { }
  },
  "required":
  [
    "type"
    "lod"
    "id"
  ]
}
```

Figure 11:
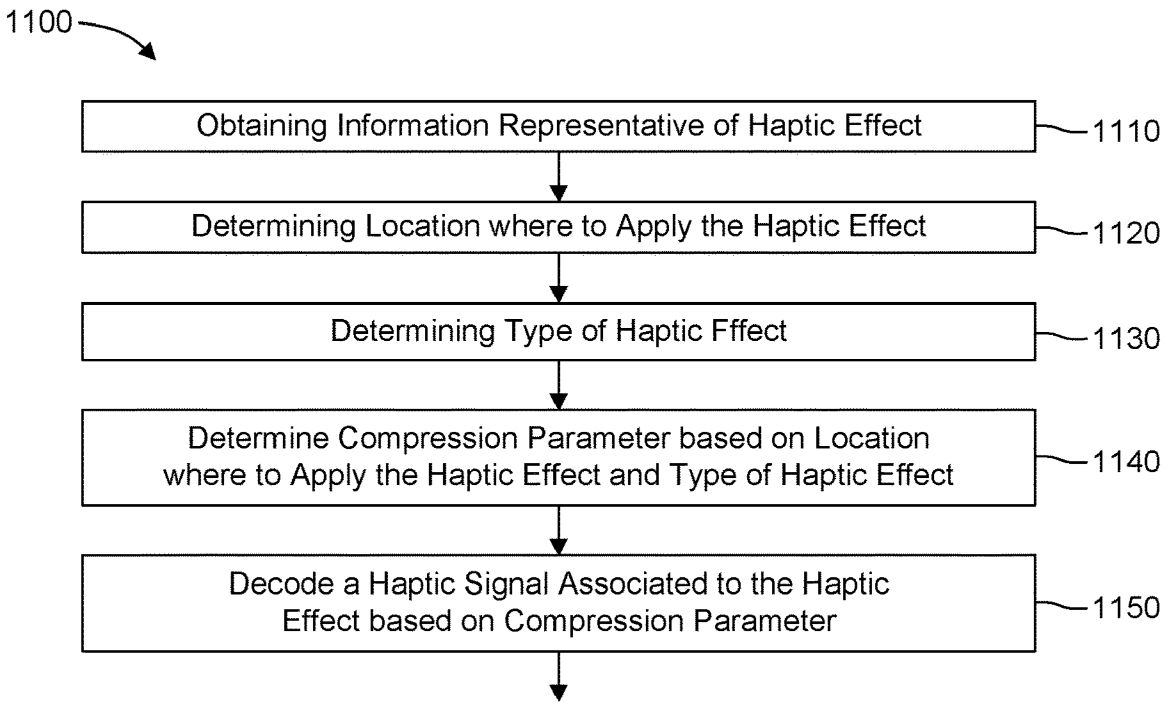
FIG. 11 illustrates an example flowchart of a decoding process according to at least one embodiment.

FIG. 11 illustrates an example flowchart of a decoding process according to at least one embodiment. Such process 1100 is typically implemented in a haptic rendering device 100 and executed by a processor 101 of such device. In step 1110, the processor obtains information representative of a haptic effect. This information is formatted according to the OHM or glTF™ file formats introduced above. In step 1120, the processor obtains from this information a location where to apply the haptic effect and, in step 1130, a type of haptic effect. Then, in step 1140, the processor determines compression parameters based on the obtained information and on a mapping between locations where to apply the haptic effect and compression parameters. This mapping is either obtained from the information representative of the haptic effect, or from more general information relative to the immersive scene or predetermined for example according to user preferences or system setting. In step 1150, a haptic signal associated with the haptic effect is then decoded based on compression parameter. This decoded haptic signal may then either be rendered by the device itself or the corresponding data may be provided to another device for the rendering of the haptic effect.

Figure 12:
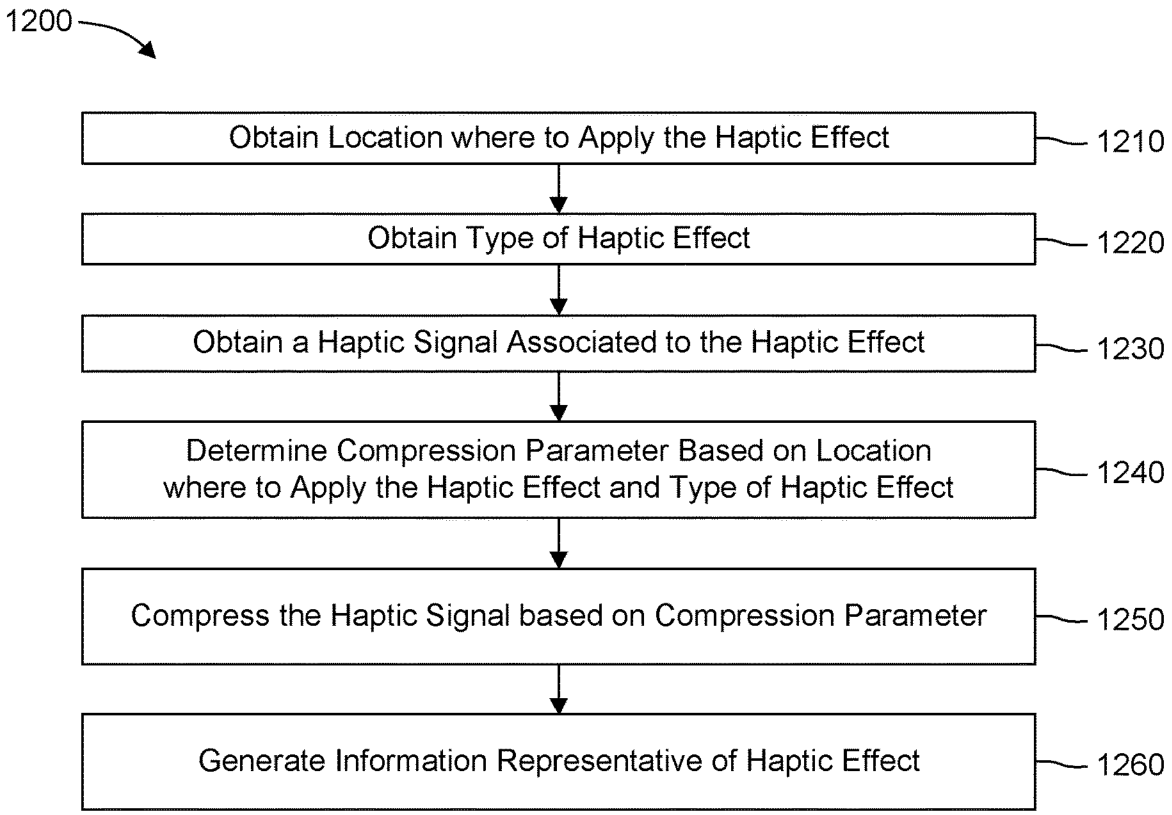
FIG. 12 illustrates an example flowchart of an encoding process according to at least one embodiment.

FIG. 12 illustrates an example flowchart of an encoding process according to at least one embodiment. Such process 1200 is typically in a computer such as a server device 180 and executed by a processor of such device. However, it may also be implemented by a haptic rendering device 100 and executed by a processor 101 of such device. In step 1210, the processor obtains from this information a location where to apply the haptic effect, in step 1220, a type of haptic effect and a haptic signal in step 1230, the haptic signal being the signal to be compressed and being associated with the haptic effect. In step 1240, the processor determines compression parameters based on the obtained information and on a mapping between locations where to apply the haptic effect and compression parameters. This mapping is either obtained from the information representative of the haptic effect, or from more general information relative to the immersive scene or predetermined for example according to user preferences or system setting. In step 1250, the haptic signal is compressed based on compression parameter. In step 1260, the processor generates information representative of a haptic effect that comprises at least the compressed haptic signal. This information is formatted according to the OHM or glTF™ file formats introduced above and also comprise other information representative of the haptic effect such as the location where to apply the haptic effect and types of haptic effect.

These encoding processes described above could be used not only for offline compression but also for streaming purposes to compress the size of the bitstream, for example in the context of bilateral teleoperation systems with kinesthetic feedback. Indeed, when interacting with a virtual world, the location of haptic effect might change. In such situation, the encoding methods described in the embodiments above allow to dynamically update compression parameters to optimize the compression level while maintaining a sufficient signal quality.

One example of application is the streaming of immersive experiences. Video game streaming is currently extremely popular. It is based on broadcasting the game experience of one player on a streaming platform so that the game session of the player can be experienced by passive users in real time. Currently, such transmission of game experience is still limited to video experiences. However, with the increasing number of devices capable of rendering augmented reality or virtual reality experiences, it is likely that such experiences will also include some haptic feedback in the future. The encoding methods described in the embodiments above would allow to stream haptic data with low bitrates in real time by optimally compressing the data. In such application of streaming of immersive game experiences, the gamer is playing a video game where his avatar interacts with the environment. Some elements in the game environment are associated with haptic signals. When a collision is detected between the avatar and the haptic object, the gamer itself feels the haptic effect conventionally. In addition, the associated haptic signal is obtained, compressed based on the location of the collision on the avatar according to one of the encoding methods described in the embodiments above and the compressed haptic effect is then streamed to the network so that the haptic effect may also be sensed by the passive users. On the client side, a passive user can experience the gameplay using different devices. The gameplay can be streamed as usual on a 2D screen or using any type of device able to render a haptic effect by obtaining the haptic stream, decompressing and rendering the haptic effect on the given device.

Another example of application of these encoding methods is cloud gaming. Cloud gaming is based on running a game on a remote server and using the network to send input information (like controller inputs) from the client device to the game server, compute the corresponding images and stream the resulting video feed to the client. In such context, similarly to video game streaming, when a collision is detected between the avatar of the user and a haptic object, the game server compresses the associated haptic data based on the location of the collision using one of the encoding methods described in the embodiments above and streams the compressed information directly to the client device. The client decompresses and renders the haptic signal on the appropriate device and/or haptic actuator.

The solutions described above for retrieving compression parameters based on body location could also be based directly on the type of haptic device being used. Typically, some haptic devices such as handheld devices, haptic belts or haptic-enabled wristbands are associated to specific body locations. Information on the type of rendering devices could then be used directly to perform the appropriate compression.

Although different embodiments have been described separately, any combination of the embodiments together can be done while respecting the principles of the disclosure.

Although embodiments are related to haptic effects, the person skilled in the art will appreciate that the same principles could apply to other effects such as the sensorial effects for example and thus would comprise smell and taste. Appropriate syntax would thus determine the appropriate parameters related to these effects.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "obtaining" various pieces of information. Obtaining is, as with "accessing", intended to be a broad term. Obtaining the information may include one or more of, for example, receiving the information, accessing the information, or retrieving the information (for example, from memory or optical media storage). Further, "obtaining" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

In variants of first, second, third and fourth aspect:

the location where to apply the haptic effect is based on body segmentation and wherein an identifier determines a location of at least part of a model.

the location where to apply the haptic effect is determined by a vertex of a geometric model.

the location where to apply the haptic effect is determined by a texture associated with a geometric model.

the compression parameter limits a maximal frequency of the haptic signal.

the compression parameter limits an amplitude of the haptic signal.

the limitation is based on Weber's law and wherein the information representative of the haptic effect comprises a compression parameter based on a Weber fraction for the limitation.

The invention claimed is:

1. A method for decoding a haptic signal, the method comprising:

obtaining information representative of a haptic effect;

determining, from the information representative of a haptic effect, a location at which to apply the haptic effect and at least one compression parameter based on the location and a type of haptic effect, wherein the location is determined based on a texture associated with a mesh of a geometric model and the at least one compression parameter is specified for an individual pixel of the texture;

decompressing a haptic signal associated with the haptic effect based on the at least one compression parameter; and decoding the decompressed haptic signal.

2. The method of claim 1, wherein the compression parameter provides a limitation for a maximal frequency of the haptic signal.

3. The method of claim 1, wherein the compression parameter provides a limitation for an amplitude of the haptic signal.

4. The method of claim 3, wherein the limitation is based on Weber's law of just noticeable differences, wherein the information representative of the haptic effect comprises a compression parameter based on a fraction, and wherein the fraction represents a minimal level of signal change for a perceptual deadband compression of kinesthetic or vibrotactile signals.

5. An apparatus for decoding a haptic signal, the apparatus comprising at least one processor configured to:

obtain information representative of a haptic effect;

determine, from the information representative of a haptic effect, a location at which to apply the haptic effect and at least one compression parameter based on the location and a type of haptic effect, wherein the location is determined based on a texture associated with a mesh of a geometric model and the at least one compression parameter is specified for an individual pixel of the texture;

decompress a haptic signal associated with the haptic effect based on the at least one compression parameter; and decode the decompressed haptic signal.

6. The apparatus of claim 5, wherein the location at which to apply the haptic effect is based on body segmentation, and wherein an identifier indicates a location of at least part of a model.

7. The apparatus of claim 5, wherein the location at which to apply the haptic effect is determined by a vertex or a set of vertices of a geometric model.

8. The apparatus of claim 5, wherein the at least one processor is configured to determine the location at which to apply the haptic effect based on a texture associated with a geometric model.

9. The apparatus of claim 5, wherein the compression parameter limits a maximal frequency of the haptic signal.

10. The apparatus of claim 5, wherein the compression parameter limits an amplitude of the haptic signal.

11. The apparatus of claim 10, wherein the limitation is based on Weber's law of just noticeable differences, wherein the information representative of the haptic effect comprises a compression parameter based on a fraction, and wherein the fraction represents a minimal level of signal change for a perceptual deadband compression of kinesthetic or vibrotactile signals.

12. The apparatus of claim 5, further comprising at least one haptic actuator and being further configured to render the haptic effect by applying the haptic signal to a haptic actuator selected based on the location where to apply the haptic effect.

13. The apparatus of claim 12, wherein the apparatus is selected in a set comprising haptic suits, smartphones, game controllers, haptic gloves, haptic chairs, haptic props and motion platforms.

14. A method for encoding a haptic signal, the method comprising:

obtaining a location at which to apply a haptic effect using a texture associated with a mesh of a geometric model;

obtaining a type of haptic effect;

obtaining a haptic signal associated with the haptic effect;

determining at least one compression parameter based on an individual pixel of the texture corresponding to the location and the type, wherein the at least one compression parameter is specified for the individual pixel;

compressing the haptic signal based on the at least one compression parameter;

generating information representative of the haptic effect; and encoding the compressed haptic signal and the information.

15. The method of claim 14, wherein the compression parameter provides a limitation for a maximal frequency of the haptic signal.

16. The method of claim 14, wherein the compression parameter provides a limitation for an amplitude of the haptic signal.

17. An apparatus for encoding a haptic signal, the apparatus comprising at least one processor configured to:

obtain a location at which to apply a haptic effect using a texture associated with a mesh of a geometric model;

obtain a type of haptic effect;

obtain a haptic signal associated with the haptic effect;

determine at least one compression parameter based on an individual pixel of the texture corresponding to the location and the type, wherein the at least one compression parameter is specified for the individual pixel;

compress the haptic signal based on the at least one compression parameter;

generate information representative of the haptic effect; and encode the compressed haptic signal and the information.

* * * * *